United States Patent

Murphy et al.

[11] Patent Number: 5,863,444
[45] Date of Patent: Jan. 26, 1999

[54] WATER DENITRIFICATION PROCESS USING AIR STRIPPING (REC-3603)

[75] Inventors: Andrew P. Murphy, Littleton; Charles D. Moody, Morrison; Lisa R. Henthorne, Evergreen, all of Colo.

[73] Assignee: The United States of America as represented by the Secretary of the Interior, Washington, D.C.

[21] Appl. No.: 898,253

[22] Filed: Jul. 22, 1997

[51] Int. Cl.⁶ ...................................................... C02F 1/70
[52] U.S. Cl. ........................... 210/743; 210/750; 210/757; 210/903
[58] Field of Search ..................................... 210/743, 750, 210/757, 748, 903

[56] References Cited

U.S. PATENT DOCUMENTS

| | | |
|---|---|---|
| 3,617,579 | 11/1971 | Gunderloy, Jr. et al. ................ 210/903 |
| 4,402,836 | 9/1983 | Fochtman et al. ....................... 210/748 |
| 4,439,326 | 3/1984 | Heilgeist ................................. 210/757 |
| 4,447,333 | 5/1984 | Wagener et al. ........................ 210/750 |
| 5,635,077 | 6/1997 | Stultz et al. ............................. 210/750 |

*Primary Examiner*—Thomas G. Wyse
*Attorney, Agent, or Firm*—E. Philip Koltos

[57] ABSTRACT

A water denitrification process is provided which comprises stopping the reduction of nitrate at nitrite, lowering the pH of the water, and then gas stripping the nitrite out of the water by using air as the gas in a sparger. This allows considerable savings to be realized based on the reduced chemical removal costs as compared to other water denitrification processes.

12 Claims, No Drawings

WATER DENITRIFICATION PROCESS USING AIR STRIPPING (REC-3603)

BACKGROUND OF THE INVENTION

1. Field of the Invention

The present invention relates to a method of denitrification of water, and more particularly to a method that reduces the need for chemicals typically used in denitrification by relying primarily on gas (air) stripping for the denitrification.

2. Prior Art

Biological denitrification is the most common method used today. However, biological denitrification suffers from a number of important disadvantages. These include slow reaction times, and, typically, the requirement for the use of large equipment. Furthermore, it is difficult to keep a viable culture of the necessary bacteria, and expensive to purchase the chemicals required to maintain the bacterial culture. Moreover, the bacterial culture maintained often itself contaminates drinking water. Additionally, bacterial cultures are frequently supplied with an organic source of carbon, such as methanol, but often some methanol remains in the water and becomes an organic contaminant thereby making biological denitrification unacceptable in most drinking water applications. Biological denitrification is an unpredictable process because throughout any given year, the nitrate level in water supply can change, and so can the size of the bacterial culture. Further complicating the use of biological denitrification is the inability to turn the process on and off like a mechanical system.

Selective ion exchange processes, such as that disclosed in U.S. Pat. No. 4,479,877 to Guter are used for denitrification mostly in drinking water applications. However, there are numerous costs associated with the ion exchange resins used in the processes. Furthermore, there is a loss of ion exchange capacity due to the oxidation of ion exchange functionalities over time. The ion exchange resins are not as rugged as the cationic ones and the amines or quaternary ammonium groups oxidize and need replacement. There are additional expenses associated with the costs of regenerant solutions and the disposal costs of waste regenerant solutions. Lastly, selective ion exchange processes are not practical at high nitrate concentrations, such as those concentrations that typically occur in irrigation runoff waters.

A third method of denitrification uses biological denitrification and the recycling of waste regenerant solutions for ion exchange processes. This method combines the two methods mentioned above, but also suffers from similar disadvantages. Specifically, the nutrient costs associated with keeping the microorganisms alive become expensive. There are also contamination concerns resulting from the microorganisms themselves. Also, the organics (i.e., carbon sources) that are supplied for the bacteria can cause contamination if these organics remain in the drinking water. Furthermore, reaction times are slow and there are other problems resulting from the unpredictable nature of the changes in nitrate levels and the size of the bacterial culture. Lastly, the dilution of the brine regenerant makes it difficult to sustain proper osmotic pressures needed to sustain the microorganisms required for denitrification.

Various chemical reduction methods are also used in denitrification. One such oxidation-reduction method is disclosed in U.S. Pat. No. 5,069,880 to Murphy (one of the inventors of this application) and is also described in an article published by Murphy, in *Nature* 350, 223–225 (1991). Another chemical reduction method is based on immobilized enzymes that proceed via nitrate production and is disclosed in an article by R. B. Mellor et al in *Nature*, 355, 717–719 (1992). A third chemical reduction method is based on hydrogen and various supported platinum metal catalysts which first produce nitrite, and then finally nitrogen gas or ammonia. (See Platinum Metals Rev. 37, 4, (1993). The disadvantages associated with any of these chemical reduction methods stem primarily from the expense associated with the reducing agent, and the undesirable reaction products left in the effluent which then requires additional post-treatment steps for removal. These are not practical processes for high concentrations of nitrate.

Another water denitrification process uses the precipitation method. However, the precipitation method is not practical for high concentrations (50–500 mg/L as $NO_3$—N) because this technology is designed to assist a selected ion exchange denitrification method. The precipitation method does become practical again at very high percentage level of nitrate where no ion exchange technology is needed. The costs associated with the chilling of waste regenerant streams is considered another disadvantage associated with the precipitation method.

Membrane processes are also used for denitrification of water. Nitrate, as an ion in water, can be removed by the use of reverse osmosis membranes along with the other ions. However, there are undesirable costs associated with the overall desalting of the water, in addition to the costs of the reverse osmosis equipment membranes themselves. Furthermore, the increased nitrate present in the reject stream may require further treatment.

SUMMARY OF THE INVENTION

Generally speaking, the water denitrification process of the present invention involves stopping the reduction of nitrate at nitrite, lowering the pH of the water, and then gas (air) stripping the nitrite out of the water. This process allows the realization of considerable savings based on a reduction of chemical and sludge removal costs. Furthermore, the discovery that air can be used during gas stripping in place of more expensive gases such as argon or nitrogen results in additional savings. The process of the present invention also avoids introduction of bacterial contamination into the product water, avoids organic contamination of product water (e.g., as a result of bioreactors that require a carbon source such as methanol which itself contaminates the product water), reduces reaction times, and enables greater control based on the physical-chemical process as opposed to the more difficult biological processes often used in previous denitrification methods.

In accordance with a preferred embodiment of the invention, a method for denitrification of water containing nitrate is provided wherein the method comprises the steps of: reducing the nitrate present in water to nitrite; adjusting the pH level of the water to below 7.0; and removing the nitrite by gas stripping using air through a sparger. In another preferred embodiment, argon gas can be used in performing the gas stripping.

Preferably, the method operates in a range of total dissolved solids approximately between 10 to 300,000 milligrams per liter, and more preferably between 40 to 260,000 milligrams per liter. The method also preferably operates in a temperature range preferably between 1° and 99° C. at a pH level between 0.1 and 6.9.

Other features and advantages of the invention will be set forth, or apparent from, the following detailed description of the preferred embodiment of the invention.

DETAILED DESCRIPTION OF THE PREFERRED EMBODIMENT

By way of background, the following equilibria, as found in Pourbaix, M. Atlas of Electrochemical Equilibria, Pergamon Press, 494–495, (1966) incorporated herein by reference, are instructive:

$$HNO_3 \rightarrow NO_3^- + H^+ \quad (1)$$

$$\log \frac{[NO_3]}{[HNO_3]} = 0.00 + pH \quad (2)$$

and $$HNO_2 \rightarrow NO_2^- + H+ \quad (3)$$

$$\log \frac{[NO_2]}{[HNO_2]} = -3.35 + pH \quad (4)$$

Equations (1) and (2) show that the nitrate ion is totally ionized, and therefore cannot be stripped. Equations (3) and (4) show that at a pH of 3.35, half of the nitrite is nonionized and could be stripped out of water. Table 1, shown below, confirms that this can be done.

Table 1 shows the results achieved when the denitrification process of the present invention was tested on one liter of water containing salts of magnesium chloride hexahydrate, calcium nitrate tetrahydrate, sodium nitrite, and sodium sulfate. When these salts were combined with the liter of water, various anions were present in the water in the amounts of 1,000 milligrams per liter of chloride, 2,000 per milligrams per liter of sulfate, and 2,000 milligrams per liter nitrite (608 milligrams per liter of $NO_2^-$—N). The pH of this solution was then adjusted to near 3.0. Using a 60–80 micron glass sparger, argon was sparged at 1–5 psig through 300 milliliters of the solution. The results are listed immediately below in Table 1.

TABLE 1

| Sparge Time (min) | Chloride (mg/L) | Sulfate (mg/L) | Nitrite (mg/L $NO_2^-$–N) | Nitrate (mg/L $NO_3^-$—N) | Temp °C. | pH |
|---|---|---|---|---|---|---|
| 0.2 | 1000 | 2000 | 555 | 22.0 | 22.3 | 2.82 |
| 2.0 | 1000 | 2000 | 478 | — | — | 3.00 |
| 5.0 | 1000 | 2000 | 433 | — | — | 3.20 |
| 10.0 | 1000 | 2000 | 277 | — | — | 2.55* |
| 20.0 | 1000 | 2000 | 175 | 18.2 | 16.1 | 2.65 |

*pH adjusted down with $H_2SO_4$

Table 1 shows that nitrite can be stripped from water even though the conditions as depicted in Table 1 are not optimized. During the process mentioned above and represented by Table 1, the temperature decreases over time, the pH tends to increase over time thus requiring a correction, and some nitrate is removed over time as well. The nitrate removal is probably due to the following chemistry:

$$2\ HNO_2 \rightarrow NO+NO_2+H_2O \quad (5)$$

$$NO+NO_3^- \rightarrow NO_2 \quad (6)$$

$HNO_2$ is unstable in water, and thus NO and $NO_2$ equilibria form. At least part of these nitrogen gases (NO and $NO_2$) are removed by gas stripping. In the process, nitrate is reduced by NO to $NO_2$, and is removed by the gas stripping as well. The additional removal of nitrate is beneficial.

A second example of water denitrification was created to be similar to the example reported above in conjunction with Table 1. In this second example, as reported in Table 2 below, the initial pH was lower than that found in Table 1, and a hot plate was introduced in order to keep the temperature of the water substantially constant although the temperature actually increased over time as shown in Table 2 below.

TABLE 2

| Sparge Time (min) | Chloride (mg/L) | Sulfate (mg/L) | Nitrite (mg/L $NO_2^-$–N) | Nitrate (mg/L $NO_3^-$—N) | Temp °C. | pH |
|---|---|---|---|---|---|---|
| 0.2 | 1000 | 2000 | 555 | 22.0 | 22.4 | 1.84 |
| 10.0 | 1000 | 2000 | 12.8 | 10.5 | 35.0 | 2.04 |

As one can see by comparing Table 1 with Table 2, the nitrite reduction after 10 minutes of sparge time was significantly greater in the Table 2 example.

In a third example of water denitrification, air was substituted for argon as the gas used for gas stripping by the sparger. Table 3 summarizes the results of this attempt. It is important to note that although about 20% of the nitrite is oxidized by the oxygen in air to nitrate, this occurs at a slower rate than the gas stripping of the nitrogen oxides from the water. Thus, although the data in Table 3 shows that some nitrite is in fact oxidized to nitrate, the overall effect is still water denitrification.

TABLE 3

| Sparge Time (min) | Chloride (mg/L) | Sulfate (mg/L) | Nitrite (mg/L $NO_2^-$–N) | Nitrate (mg/L $NO_3^-$—N) | Temp °C. | pH |
|---|---|---|---|---|---|---|
| 0.2 | 476 | 1350 | 406 | <10 | 21.6 | 1.90 |
| 2.0 | 476 | 1350 | 340 | — | — | — |
| 5.0 | 476 | 1350 | 145 | — | — | — |
| 10.0 | 476 | 1350 | 83.6 | — | — | — |
| 15.0 | 476 | 1350 | 51.0 | 81.6 | 14.9 | — |

In the water denitrification example reported in Table 4, a hot plate was introduced in order to keep the water temperature substantially constant although, again, the temperature actually increased over time. It should be noted that air was used once again during gas stripping.

TABLE 4

| Sparge Time (min) | Chloride (mg/L) | Sulfate (mg/L) | Nitrite (mg/L $NO_2^-$–N) | Nitrate (mg/L $NO_3^-$—N) | Temp °C. | pH |
|---|---|---|---|---|---|---|
| 0.2 | 476 | 1350 | 406 | <10 | 21.8 | 1.96 |
| 5.0 | 476 | 1350 | 45 | — | — | — |
| 10.0 | 476 | 1350 | <10 | — | — | — |
| 15.0 | 476 | 1350 | <10 | — | 38.3 | — |

Table 5 reports the results of a practical example used to demonstrate denitrification using a drinking water sample with an elevated nitrate level. In this example, 270 milliliters of water were irradiated with a 20 watt UV lamp that typically produces light with a wavelength of 254 nanometers. The irradiation occurred for 15 minutes.

TABLE 5

| ION | mg/L Before UV and gas stripping | mg/L After UV and gas stripping |
|---|---|---|
| Na+ | 195 | — |
| K+ | 10 | — |

TABLE 5-continued

| ION | mg/L Before UV and gas stripping | mg/L After UV and gas stripping |
|---|---|---|
| $Ca^{2+}$ | 26 | — |
| $Mg^{2+}$ | 22 | — |
| Cr | 74 | — |
| $HCO_3^-$ | 200 | — |
| $NO_3^-$* | 20.0 | <10 |
| $SO_4^{2-}$ | 250 | — |
| pH | 7.8 | 3.1 |

*As mg/L $NO_3$—N, otherwise 85.6 mg/L $NO_3^-$ before UV and stripping, and <40 after Having lowered the pH to 3.0 and after sparging with air for 10 minutes, nitrate can be removed, as shown in Table 5, from 20 milligrams per liter $NO_3$—N to below the maximum U.S. EPA limit of 10 milligrams per liter $NO_3$—N, even without having optimized the conditions. Except for the pH adjustment, this process is a chemical-free denitrification of water. Due to the rejection of many other denitrification processes due to the costs of chemicals and/or ammonia removal, the process of the present invention appears to be very attractive, based on its economical advantage over other denitrification processes.

It has been determined that the pH range to be employed in the process of the present invention is below 7.0, preferably between 0.1 and 6.9. The temperature range used in the process of the present invention is preferably between 1° C. to 99° C. The total dissolved solids range (TDS) range is approximately between 10 and 300,000, and preferably between 40 to 260,000, milligrams per liter.

In an alternate embodiment, UV radiation of water with nitrate can result in the formation of peroxynitric and/or peroxynitrous anions in addition to nitrite ions, all of which can be removed by adjusting the pH level of the water by acidification, and then using air stripping in the manner described above.

As discussed above, in accordance with the invention, nitrate is first reduced to nitrite by such means as chemical reduction, photo reduction, electrochemical reduction, or any other satisfactory reduction method. Then, taking advantage of the fact that nitrate is the anion of a strong acid, but that nitrite is the anion of a weak acid, the pH of the water is adjusted by acidification to below a pH of 7.0 so that this weak acid ($HNO_2$) can then be removed by gas stripping using air as the gas.

It should be noted that there are numerous denitrification methods that reduce nitrate to nitrite. However, for water treatment processes, little thought has been given to reduce nitrate only as far as nitrite because: 1) this would not remove nitrogen from the water, 2) nitrite will be air oxidized back to nitrate, and 3) nitrite is generally considered more toxic than the nitrate ion in water.

The uniqueness of the present invention can be appreciated by understanding that the following conditions are met thereby:

1) most chemical denitrification processes reduce nitrate to ammonia. This is an eight electron exchange, and the ammonia must be removed from the water to complete the denitrification by air stripping. Since the method of the present invention requires only a two electron exchange, fewer chemicals are required. In fact, as shown above in Table 5, it is possible to denitrify water with the method of the present invention without any chemicals except for those used during pH adjustment;

2) when considering denitrification for use during sludge removal, where significant costs are a direct result from the chemicals required for use during the chemical denitrification process normally used, employing the method of the present invention enables significant cost savings to be realized;

3) using the technology common in nitric acid production plants, the nitrogen oxides stripped from water that is denitrified using the present invention can be collected on zeolites to generate concentrated streams of nitrate or nitric acid which can then be sold commercially; and 4) although during air stripping nitrite can be oxidized by the oxygen in air back to nitrate, it has been found that the denitrification of water by air stripping occurs at a greater rate than the rate of nitrite oxidation to nitrate.

Although the present invention has been described to specific exemplary embodiments thereof, it will be understood by those skilled in the art that variations and modifications can be effective in this exemplary embodiments without departing from the scope and spirit of the invention.

What is claimed is:

1. A method for denitrification of water containing nitrate, said method comprising the steps of:

reducing said nitrate present in water to nitrite;

adjusting the pH level of the water to below 7.0; and removing said nitrite by gas stripping.

2. A method according to claim 1 wherein said gas stripping comprises sparging.

3. A method according to claim 1 wherein said gas stripping comprises air stripping.

4. A method according to claim 1 wherein said gas stripping comprises using argon gas.

5. A method according to claim 1 wherein the total dissolved solids range in the water is substantially between 10 to 300,000 milligrams per liter.

6. A method according to claim 5 wherein said total dissolved solids range in the water is substantially between 40 to 260,000 milligrams per liter.

7. A method according to claim 1 further comprising maintaining the temperature of said water substantially constant.

8. A method according to claim 1 wherein said temperature is maintained substantially between 1° and 99° C.

9. A method according to claim 1 further comprising maintaining said pH at a substantially constant level.

10. A method according to claim 1 wherein said pH is maintained between a range substantially between 0.1 to 6.9.

11. A method according to claim 1 wherein said reducing of said nitrate to said nitrite comprises a reduction method selected from the group consisting of chemical reduction, photo reduction, and electrochemical reduction.

12. A method for denitrification of water containing nitrate and having a range of total dissolved solids between 10 and 300,000 milligrams per liter, said method comprising:

reducing nitrate in the water to nitrite; lowering the pH level to below 7.0 while maintaining the temperature of the water between 1° and 99° C.; and removing the nitrite by air stripping.

* * * * *